United States Patent [19]

Druet et al.

[11] Patent Number: 5,008,365

[45] Date of Patent: Apr. 16, 1991

[54] NEW PROCESS FOR THE MANUFACTURE OF UREA-FORMALDEHYDE RESINS CONTAINING MELAMINE

[75] Inventors: Bernard Druet, Choisy Aubac; Gerald Rochet, Fontaines Chaaly, both of France

[73] Assignee: Norsolor (Orkem Group), Paris LaDefense, France

[21] Appl. No.: 477,144

[22] Filed: Feb. 8, 1990

Related U.S. Application Data

[63] Continuation of Ser. No. 289,274, Dec. 23, 1988, abandoned.

[30] Foreign Application Priority Data

Dec. 23, 1987 [FR] France .................................. 87 17997

[51] Int. Cl.$^5$ .............................................. C08G 12/32
[52] U.S. Cl. .................................. 528/230; 528/232; 528/239; 528/254; 528/256; 428/524; 428/526; 428/528
[58] Field of Search ............... 528/230, 232, 239, 254, 528/256; 428/524, 526, 528

[56] References Cited

U.S. PATENT DOCUMENTS

| | | | |
|---|---|---|---|
| 3,891,590 | 6/1975 | Sundie et al. | 524/701 |
| 4,814,422 | 3/1989 | Diem et al. | 528/230 |

FOREIGN PATENT DOCUMENTS

| | | |
|---|---|---|
| 0001596 | 5/1979 | European Pat. Off. . |
| 0062389 | 10/1982 | European Pat. Off. . |
| 2620478 | 11/1977 | Fed. Rep. of Germany . |
| 2504542 | 10/1982 | France . |

*Primary Examiner*—John Kight, III
*Assistant Examiner*—Sam A. Acquah
*Attorney, Agent, or Firm*—Millen, White & Zelano

[57] ABSTRACT

A process for the preparation of a urea-formaldehyde resin exhibiting reduced gel time and improved stability, wherein the resin contains not more than 10% melamine, which is added during the first stage of the reaction with the other reactants, and wherein the reaction is conducted at an acidic pH.

19 Claims, No Drawings

PROCESS FOR THE MANUFACTURE OF UREA-FORMALDEHYDE RESINS CONTAINING MELAMINE

This application is a continuation of application Ser. No. 289,274, filed Dec. 23, 1988.

BACKGROUND OF THE INVENTION

The present invention relates to a new process for the manufacture of urea-formaldehyde resins containing melamine; its subject matter is more particularly a process for the manufacture of melamine-"doped" urea-formaldehyde resins which give off very little formaldehyde.

Urea-formaldehyde resins are known products which are widely employed in the woodworking industry, particularly for the manufacture of particle boards. They are manufactured in a known manner by condensation of urea and of formaldehyde at a pH of between 4 and 7 and at a temperature close to boiling point; this condensation reaction is preferably carried out in several stages.

The chief disadvantage of urea-formaldehyde resins is that they cause large quantities of free formaldehyde to be given off. Attempts have been made to reduce the free formaldehyde content by using various methods of manufacture; unfortunately, when the aim is to attain particularly low formaldehyde contents, experience shows that this objective is accompanied both by a decrease in the reactivity and in the stability of the resins and by a deterioration in the mechanical properties of the finished boards. In order to get rid of the free formaldehyde it has also been proposed to employ resins devoid of formaldehyde, particularly resins based on isocyanate solutions. Unfortunately, the problem of the isocyanates is also liable to present toxicological problems.

Another means of limiting the emissions of free formaldehyde consists in adding substances which fix this compound. Among these substances, there may be mentioned, for example, urea, melamine, phenol or else flours with a high protein content. Unfortunately, all the processes using these additives which are capable of fixing formaldehyde when they are added to the urea-formaldehyde resins have awkward secondary effects; in particular they retard the final condensation and consequently the curing of the adhesives.

Among the processes which make use of melamine, it has been proposed, in particular, to add melamine in the final condensation stage at the end of the condensation of urea and of formaldehyde. While a process of this kind makes it possible to obtain resins which can be used to manufacture particle boards exhibiting tolerable free formaldehyde contents combined with acceptable mechanical properties, it leads, on the other hand, to resins exhibiting high gel times. These high gel times mean that the urea-formaldehyde resin containing melamine to which a cure catalyst has been added will take a long time to cure when heated, and this means that, on a production line, the board cure cycle times are long, which reduces the output rates.

There is therefore a need to develop urea-formaldehyde resins containing not more than 10% of melamine and exhibiting reduced gel times.

SUMMARY OF THE INVENTION

The present invention relates to a process for the manufacture of urea-formaldehyde resins containing not more than 10% of melamine and exhibiting a final $F/NH_2$ molar ratio of between 0.5 and 0.575, the $NH_2$ groups being the sum total of the $NH_2$ groups of urea and of melamine which are used, according to which a part of the urea and the formaldehyde are condensed at an acidic pH in a first stage, then melamine is added at a basic pH, the remaining urea being added in a third stage at a basic pH, characterized in that the melamine is added in the first stage of condensation of urea and of a source of formaldehyde, this condensation being conducted at an acidic pH, the quantity of urea and formaldehyde used being such that the $F/NH_2$ molar ratio at this stage is not more than 1.5, the molar equivalents of the $NH_2$ groups being the sum total of the $NH_2$ groups of urea and of melamine used.

It has been found that operation under these conditions produced urea-formaldehyde resins containing less than 10% of melamine which exhibit reduced gel times, together with particularly improved stabilities during storage and high adhesiveness when cold.

The process of the present application consists in adding melamine during the first stage of condensation of urea and a source of formaldehyde: this condensation is conducted at an acidic pH of between 4.5 and 6.5. In a known manner, instead of employing formaldehyde by itself during this condensation stage, it is also possible to use precondensates of urea and of formaldehyde. The quantity of urea and of formaldehyde used during this stage, whatever the form of the reactants used, urea and formaldehyde separately or urea-formaldehyde precondensates and urea, is such that the $F/NH_2$ molar ratio at this stage does not exceed 1.5, the $NH_2$ groups being the sum total of the $NH_2$ groups of urea and of melamine which are used. In a known manner, the quantity of melamine which is used does not exceed 10% by weight relative to the weight of the liquid solution of resin. In a known manner, the process of the present application comprises a second stage of addition of the remaining urea. This second stage is conducted at a pH value which is identical with that of the 1st stage.

The following examples illustrate the present invention. The quantities are expressed in parts by weight.

EXAMPLES

Example 1

14,500 parts of 50% formaldehyde are introduced into a reactor equipped with a condenser, a stirrer and a heating device, the pH is adjusted to 7.5 with a sodium hydroxide solution and 5150 parts of solid urea and 1650 parts of melamine are then added. The $F/NH_2$ molar ratio as defined above is 1.15. The reaction mixture is heated to a temperature of 98° C.; the reaction mixture is then cooled to 90° C. and is then acidified with formic acid so that the pH does not exceed 5.6. Heating is continued at 85°–90° C. After cooling the reaction mixture to 80° C. and when the viscosity reaches 450–500 mPa s at 40° C., 7800 parts of urea are added while the pH is maintained at 5.6. The addition of urea causes a drop in temperature, which is maintained at 55°–60° C. When the water tolerance of the reaction mixture is 2/1 (expressed by the cloudiness at 25° C. of a mixture consisting of 3 volumes of resin to 6 volumes of water), the mixture is neutralized with a caustic soda solution until the pH is close to 8. The resin solution is then concentrated under vacuum at about 55° C. 1500 parts of water are removed. The resin obtained exhibits the following characteristics:

| | |
|---|---|
| Viscosity 20° C. | 900 mPa s |
| Solids content | 65% (measured as the weight of residue of a sample dried 2 h at 120° C.) |
| pH | 8.5 |
| Relative density 20° C. | 1.285 |
| Gel time at 100° C. | 80 seconds (with 5% of a 15% strength ammonium chloride solution) |
| Gel time at 80° C. | 4 min 30 s (with 10% of 15% strength NH$_4$Cl solution). |

After two months' storage at 20° C., the resin exhibits a viscosity of 1250 mPa s at 20° C.

The resin obtained is employed for the manufacture of 3-layer particle boards. The conditions of manufacture of these boards are the following:

| | |
|---|---|
| Adhesive content as solid resin relative to the weight of dry wood | 8% as inner layer and 11% as outer layer |
| Paraffin content (60% Mobilcer) (expressed on dry basis relative to the weight of dry wood). | 0.5% as inner layer and 0.7% as outer layer |
| Content of hardener (NH$_4$Cl) (expressed on dry basis relative to the weight of solid resin). | 1.5% as inner layer 0.75% as outer layer |

The particle boards are cured under a pressure of 3.5 N/mm$^2$ at 180° C. for 4 minutes. The properties of the boards obtained are the following:

| | |
|---|---|
| Thickness (mm) | 20.05 |
| Density (kg/m$^3$) | (illegible) |
| Swelling (in water 20° C., 24 hours) | |
| According to NF B51252 | 13.0% |
| According to DIN N68763 | 13.5% |
| Perpendicular tensile (daN/cm$^2$) | 8.1 |
| Perforator formaldehyde (mg/100 g dry board) | 9.0 |
| The properties have been determined according to the following standards: | |
| Thickness | NFB 51200 |
| Density | NFB 51222 |
| Perpendicular tensile | NFB 51250 |
| NF swelling | NFB 51252 |
| DIN swelling | 68763 |
| Formaldehyde content | CEN-EN120 (perforator) |

Example 2

Example 1 is repeated but using 0, 2, 4 and 6% of melamine in 4 different tests. In each test, the quantities of formaldehyde, of urea and of melamine are adjusted (except in the first) so that the F/NH$_2$ molar ratio in the first stage is 1.145 (F/U = 2.10 in the case of the test not comprising melamine). This first stage is carried out at an acidic pH up to a determined viscosity (values given in the Table below).

In a second stage, urea is added to give an F/NH$_2$ of 0.532 (F/U = 1.06 in the case of the test without melamine). The condensation is performed at an acidic pH, at about 55° C., up to a determined water tolerance (values given in the Table below):

| | Resin 0% Melamine | 2% Melamine | 4% Melamine | 6% Melamine |
|---|---|---|---|---|
| 1st stage | | | | |
| Condensation pH | 4.5 | 5.1 | 5.3 | 5.6 |
| Viscosity 40° C. (mPa s) (stage end) | 435 | 347 | 345 | 370 |
| 2nd stage | | | | |
| Condensation pH | 5.5 | 5.1 | 5.3 | 5.6 |
| Water tolerance (2nd stage end) | 3/1 at 26° C. | 2/1 at 18° C. | 2/1 at 24° C. | 2/1 at 29° C. |

The characteristics of the resins obtained and of the boards manufactured with these resins under the conditions given in Example 1 are summarized in the appended table.

TABLE

| Test No. | Test 1 2% Melamine | Test 2 4% Melamine | Test 3 6% Melamine | Test 4 0% Melamine |
|---|---|---|---|---|
| RESINS | | | | |
| Viscosity (20° C.) (mPa s) | 920 | 800 | 740 | 1015 |
| pH | 7.9 | 7.8 | 8.0 | 8.0 |
| Solids content % | 65.1 | 65.2 | 65.4 | 65.2 |
| Miscibility with water | 1/1 | 1/1 | 1/1 | >1.5/1 |
| Gel time at 100° C. (s) | 70 | 73 | 73 | 62 |
| Stability at 20° C. (viscosity after X days) | 1100 (37 days) | 990 (36 days) | 1025 (35 days) | 1075 (32 days) |
| mPa s after 2 months | 1440 | 1200 | 1300 | 3700 |
| BOARDS | | | | |
| Thickness (mm) | 20.05 | 20.03 | 20 | 20.09 |
| Density (kg/m$^3$) | 633.7 | 634.6 | 631.5 | 630.8 |
| Swelling (water 20° C., 24 h) | | | | |
| NF | 16.4 | 14.9 | 13.5 | 17.5 |
| DIN | 16.7 | 15.4 | 14.1 | 17.8 |
| Perpendicular tensile | 7 | 7.8 | 8.4 | 6.3 |
| Perforator formaldehyde | 7.7 | 8.2 | 8 | 8.5 |

Example 3

Example No. 1 is repeated, but a urea-formaldehyde precondensate (formaldehyde: 56.1%, urea: 23%, F/U = 4.88) is employed as starting material instead of a solution of formaldehyde.

1197 parts of this precondensate, 199 parts of urea beads, 153 parts of melamine and 279 parts of water are introduced into a reactor equipped with a condenser, a stirrer and a heating and cooling device. The mixture is heated to 95°-100° C. for 10 minutes; then, at 95° C., it is acidified to pH 5.9 with 1.1 ml of 36% strength formic acid. It is condensed at 85°-95° C. until the viscosity of the resin at 40° C. gives a flow time of 26 seconds, measured with a DIN cup equipped with a 6 mm die. 672 parts of urea beads are then introduced and the reaction is then continued for 20 minutes at 60° C. 2 ml of 25% strength sodium hydroxide are then added to obtain a pH in the region of 8. The characteristics of the resin obtained are the following:

| | |
|---|---|
| Viscosity 20° C. | 860 mPa s |
| Solids content | 65% |
| Relative density 20° C. | 1.287 |
| pH | 8.3 |
| Gel time at 100° C. | 82 seconds |
| (with 5% of a 15% strength NH₄Cl solution) | |
| Storage at 20° C. | 1180 mPa s after 2 months |

This resin was employed for the manufacture of particle boards under the same conditions as those described in Example No. 1. The characteristics of the boards obtained are the following:

| | |
|---|---|
| Thickness (mm) | 20.08 |
| Density (kg/m³) | 631 |
| Swelling in water 20° C. 24 h | |
| According to NF standard | 14.0% |
| According to DIN standard | 14.4% |
| Perpendicular tensile (daN/cm²) | 7.9 |
| Perforator formaldehyde (mg/100 g dry board) | 7.5 |

Comparative Example 4

The following resin is prepared in a known manner, by way of comparison: 2688 parts of 40% strength formaldehyde are introduced into a reactor equipped with a condenser, a stirrer and a heating and cooling device, the pH is adjusted to 8 by adding caustic soda solution and then 1024 parts of solid urea are added. The mixture is heated to boiling and the pH is then adjusted to 5.0 with formic acid.

The condensation, conducted at a temperature close to boiling for a period of 45 minutes is stopped by adjusting the pH value to 8 by adding sodium hydroxide. 248 parts of melamine are then added and the condensation is continued while the pH value is kept at about 8 and at a temperature close to boiling for another 20 minutes. At this stage 820 parts of solid urea are added and the resin is then concentrated under vacuum to a solids content of approximately 65%.

The resin is then cooled to ambient temperature. It contains approximately 6% melamine and as an F/NH₂ of 0.532. The resin obtained exhibits the following characteristics:

| | |
|---|---|
| Viscosity 20° C. | 650 mPa s |
| Solids content | 65% |
| pH | 8.5 |
| Relative density | 1.286 |
| Gel time at 100° C. | 125 s |
| (with 5% of a 15% strength ammonium chloride solution) | |
| Gel time at 80° C. | 450 s |
| (with 10% 15% strength NH₄Cl solution) | |
| Storage at 20° C. | 3000 mPa s after 2 months |

The boards manufactured with this resin, still under the conditions of Example 1, exhibit the following characteristics:

By way of comparison (without relation to the invention):

| | |
|---|---|
| Thickness (mm) | 20.11 |
| Density (kg/m³) | 629 |
| Swelling in water 24 h at 20° C. | |
| According to NF standard | 15.2 |
| According to DIN standard | 15.7 |
| Perpendicular tensile (daN/cm2) | 7.1 |
| Perforator formaldehyde (mg/100 g dry board) | 8.9 |

What is claimed is:

1. A multistage process for the manufacture of urea-melamine-formaldehyde resins containing not more than 10% of melamine and exhibiting a final F/NH₂ molar ratio of between 0.5 and 0.575, the NH₂ groups being the sum total of the NH₂ groups of urea and of melamine which are used, comprising adding the melamine in a first stage of condensation of urea and of a source of formaldehyde, the condensation with melamine being conducted at an acidic pH, under heat, the quantity of urea and formaldehyde used being such that the F/NH₂ molar ratio at this stage is not more than 1.5, the molar equivalents of the NH₂ groups being the sum total of the NH₂ groups of urea and of melamine used until the viscosity of the solution is at least 345 mPa s at 40° C., and introducing additional urea to resultant hot condensation product in a second stage, the quantity of urea an formaldehyde used being such that the F/NH₂ molar ratio at this stage is not more than 1.5, the molar equivalents of the NH₂ groups being the sum total of the NH₂ groups of urea and of melamine used, and introducing additional urea to resultant condensation product in a second stage at an acidic pH to effect further condensation so as to obtain said final F/NH₂ molar ratio.

2. A process of claim 1, further comprising neutralizing the thus-formed reaction mixture after the second stage of condensation is complete.

3. A resin produced by a process of claim 1.

4. A resin produced by a process of claim 2.

5. In particle board comprising wood and a resin, the improvement wherein the resin is the resin of claim 3.

6. In a particle board comprising wood and a resin, the improvement wherein the resin is the resin of claim 4.

7. A multistage process according to claim 1, wherein the pH of the condensation with melamine is 5.114 5.6, and the pH for the introduction of additional urea in the second stage is 5.1–5.6.

8. A resin produced by the process of claim 7.

9. In a particle board comprising wood and a resin, the improvement wherein the resin is the resin of claim 8.

10. A process according to claim 2, wherein the pH of the condensation with melamine is 5.1–5.6, and the pH for the introduction of additional urea in the second stage is 5.1–5.6.

11. A resin produced by the process of claim 10.

12. In a particle board comprising wood and a resin, the improvement wherein the resin is the resin of claim 11.

13. A process according to claim 1, wherein amount of melamine is 2–6% by weight.

14. The resin produced according to the process of claim 13.

15. In a particle board comprising wood and a resin, the improvement wherein the resin is the resin of claim 14.

16. A process according to claim 1, wherein the F/NH₂ molar ratio in the first stage is about 1.15.

17. A process according to claim 13, wherein the F/NH₂ molar ratio in the first stage is about 1.15.

18. A resin produced by the process of claim 16.

19. In a particle board comprising wood and a resin, the improvement wherein the resin is the resin of claim 17.

* * * * *